United States Patent
Zhang et al.

(10) Patent No.: US 10,731,002 B2
(45) Date of Patent: Aug. 4, 2020

(54) SEMIAROMATIC COPOLYAMIDE RESIN AND POLYAMIDE MOLDING COMPOSITION CONSISTING OF THE SAME

(71) Applicants: KINGFA SCI. & TECH. CO., LTD., Guangdong (CN); ZHUHAI VANTEQUE SPECIALTY ENGINEERING PLASTICS CO., LTD., Guangdong (CN); SHANGHAI KINGFA SCI. & TECH. DVPT. CO., LTD., Shanghai (CN)

(72) Inventors: Chuanhui Zhang, Guangdong (CN); Min Cao, Guangdong (CN); Sujun Jiang, Guangdong (CN); Zhenguo Shi, Guangdong (CN); Xueke Sun, Guangdong (CN); Liming Fan, Guangdong (CN); Mingqin Chen, Guangdong (CN); Mujun Huang, Guangdong (CN); Xianbo Huang, Guangdong (CN)

(73) Assignees: KINGFA SCI. & TECH. CO., LTD., Guangdong (CN); ZHUHAI VANTEQUE SPECIALTY ENGINEERING PLASTICS CO., LTD., Guangdong (CN); SHANGHAI KINGFA SCI. & TECH. DVPT. CO., LTD., Shanghai (CN)

(*) Notice: Subject to any disclaimer, the term of this patent is extended or adjusted under 35 U.S.C. 154(b) by 276 days.

(21) Appl. No.: 15/737,320

(22) PCT Filed: Mar. 29, 2017

(86) PCT No.: PCT/CN2017/078640
§ 371 (c)(1),
(2) Date: Dec. 18, 2017

(87) PCT Pub. No.: WO2018/049807
PCT Pub. Date: Mar. 22, 2018

(65) Prior Publication Data
US 2019/0002639 A1    Jan. 3, 2019

(30) Foreign Application Priority Data

Sep. 14, 2016 (CN) .......................... 2016 1 0827155

(51) Int. Cl.
| | |
|---|---|
| *C08G 69/36* | (2006.01) |
| *C08L 77/02* | (2006.01) |
| *C08G 69/14* | (2006.01) |
| *C08G 69/12* | (2006.01) |
| *C08L 77/10* | (2006.01) |
| *C08G 69/16* | (2006.01) |
| *C08K 7/14* | (2006.01) |
| *C08J 5/04* | (2006.01) |

(Continued)

(52) U.S. Cl.
CPC ............ *C08G 69/36* (2013.01); *C08G 69/12* (2013.01); *C08G 69/14* (2013.01); *C08G 69/16* (2013.01); *C08J 5/005* (2013.01); *C08J 5/04* (2013.01); *C08J 5/043* (2013.01); *C08K 3/34* (2013.01); *C08K 5/5313* (2013.01); *C08K 7/14* (2013.01); *C08K 13/02* (2013.01); *C08L 77/00* (2013.01); *C08L 77/02* (2013.01); *C08L 77/10* (2013.01); *C08J 2377/02* (2013.01); *C08J 2377/10* (2013.01); *C08J 2423/22* (2013.01); *C08K 2003/343* (2013.01); *C08K 2201/003* (2013.01); *C08K 2201/004* (2013.01); *C08K 2201/016* (2013.01); *C08L 2201/02* (2013.01); *C08L 2201/08* (2013.01)

(58) Field of Classification Search
CPC ........ C08G 69/02–08; C08G 69/14–20; C08G 69/36; C08L 77/02–04; C08L 77/10
See application file for complete search history.

(56) References Cited

U.S. PATENT DOCUMENTS

| | | | |
|---|---|---|---|
| 2,688,011 A | 8/1954 | Wheatley et al. | |
| 4,844,834 A * | 7/1989 | Dellinger | C08G 69/16 252/182.3 |
| 5,070,155 A * | 12/1991 | Liu | C08G 69/36 525/425 |

FOREIGN PATENT DOCUMENTS

| | | |
|---|---|---|
| CN | 101768265 | 7/2010 |
| CN | 102159620 | 8/2011 |

(Continued)

OTHER PUBLICATIONS

Machine translation of CN103122063A. May 29, 2013. (Year: 2013).*

(Continued)

*Primary Examiner* — Stephen E Rieth
(74) *Attorney, Agent, or Firm* — JCIPRNET

(57) ABSTRACT

A semiaromatic copolyamide resin and a polyamide molding composition consisting of the same are provided, consisting of following repeat units: (A) 26-80 mol % of units derived from para-amino benzoic acid; (B) 4-70 mol % of units derived from 11-aminoundecanoic acid or undecanolactam, and 0-70 mol % of units derived from another amino acids having 6 to 36 carbon atoms or units consisting of a lactam having 6-36 carbon atoms; (C) 0-37 mol % of units derived from a diamine unit having 4 to 36 carbon atoms; and (D) 0-37 mol % of units derived from a diacid unit having 6 to 36 carbon atoms; wherein, (A)+(B)+(C)+(D)=100 mol %; and molar contents of the units derived from para-amino benzoic acid and those derived from 11-aminoundecanoic acid or undecanolactam are not equal to 50 mol % simultaneously.

10 Claims, No Drawings

(51) Int. Cl.
*C08L 77/00* (2006.01)
*C08J 5/00* (2006.01)
*C08K 3/34* (2006.01)
*C08K 5/5313* (2006.01)
*C08K 13/02* (2006.01)

(56) References Cited

FOREIGN PATENT DOCUMENTS

| | | | |
|---|---|---|---|
| CN | 102653594 | 9/2012 | |
| CN | 103122063 | 5/2013 | |
| CN | 103665373 | 3/2014 | |
| CN | 106336508 | 1/2017 | |
| EP | 0085175 | 8/1983 | |
| GB | 814222 A * | 6/1959 | ............. C08G 69/08 |

OTHER PUBLICATIONS

Kemmish, D. J. Practical Guide to High Performance Engineering Plastics. 2011. Smithers Rapra. pp. 47-55. (Year: 2011).*
Askeland, D. R. The Science and Enginerring of Materials. 1996. Springer Science+Business Media Dordrecht. pp. 549-594. (Year: 1996).*

\* cited by examiner

SEMIAROMATIC COPOLYAMIDE RESIN AND POLYAMIDE MOLDING COMPOSITION CONSISTING OF THE SAME

CROSS-REFERENCE TO RELATED APPLICATION

This application is a 371 of international application of PCT application serial no. PCT/CN2017/078640, filed on Mar. 29, 2017, which claims the priority benefit of China application no. 201610827155.1, filed on Sep. 14, 2016. The entirety of each of the above-mentioned patent applications is hereby incorporated by reference herein and made a part of this specification.

BACKGROUND

1. Field of the Invention

The present invention relates to a technical field of engineering plastics, and specifically relates to a semiaromatic copolyamide resin and a polyamide molding composition consisting of the same.

2. Description of Related Art

Since a polyamide resin possesses excellent comprehensive properties, including mechanical properties, heat resistance, wear resistance, chemical resistance, self-lubrication, low friction coefficient and a certain flame resistance, it is widely suitable to be reinforced and modified by being filled with glass fiber and other fillers, and also suitable for aspects such as enhancing performance and extending application range. In recent years, a semiaromatic polyamide has been critically developed due to its better heat resistance and mechanical properties.

Owing to a higher water absorption, PA66 has a poor dimensional stability and severely decreased mechanical properties when it has been used for a long time. Besides, PA66 has a lower melting point so that it is difficult to be used in occasions that demand higher heat resistance such as an electronic and electrical occasion and a SMT technology occasion.

With regard to above problems of PA66, a general solution in the industry is replacing adipic acid with terephthalic acid to obtain the semiaromatic polyamide. Introducing a benzene ring enhances a rigidity of a molecular chain, improves its crystallization property, decreases the water absorption and increases the melting point. Examples of the above-mentioned semiaromatic polyamide, such as PA6T/66, PA9T and PA10T, have been widely used in the industry.

So far, it has been generally acknowledged that "aromatic" units of the semiaromatic polyamide are mostly derived from terephthalic acid, while other sources of the "aromatic" units are rarely involved.

Mitsubishi Group has developed a well-known product MXD6 which is a product based on m-xylylenediamine and adipic acid. In fact, MXD6 can be also known as a semiaromatic polyamide, but with lower melting point of only 240° C., and generally, it is not regarded as the semiaromatic polyamide in the traditional sense.

CN102159620 discloses a semiaromatic polyamide based on m-xylylenediamine, such as PXD10 with a melting point reaching to 290° C., having high heat resistance and low water absorption, as a breakthrough of the semiaromatic polyamide in a "non-terephthalic acid" field.

U.S. Pat. No. 2,688,011 brings forward a method of synthesizing a polyamide based on para-amino benzoic acid (PABA), i.e. copolymerizing para-amino benzoic acid with an aliphatic diamine having an even number (14 at most) of methylene and an aliphatic diacid having an even number (14 at most) of methylene, wherein the diamine and the diacid are equimolar, and para-amino benzoic acid accounts for 5-25 mol % of all monomeric units. However, owing to a relative low amount of para-amino benzoic acid, the melting point of the obtained semiaromatic polyamide is relatively low. For example, an embodiment thereof has achieved a copolymer of PABA and nylon-66 salt, wherein an amount of PABA accounts for 9.6 mol % of all monomeric units. The copolymer has a melting point of only 248-250° C. and is difficult to reach a demand for heat resistance.

CN103122063 brings forward a preparation method of a semiaromatic polyamide resin based on amino undecanediacid (AUA) and PABA, i.e. after mixing and salifying amino undecanediacid, para-amino benzoic acid, distilled water and catalyst, carrying out a melt polymerization reaction to obtain a copolymer of AUA and PABA, with a melting point of 310° C. approximately. It is required that AUA and PABA must have an equal molar ratio, otherwise "a condensation polymerization of nylon would be destroyed and the polymerization cannot be proceeded with".

In view of this, a semiaromatic copolyamide resin based or mainly based on "non-terephthalic acid" monomers with high heat resistance, improved color property and low water absorption, and a polyamide molding composition consisting of the same are desiderated in the art.

SUMMARY

In order to overcome the drawbacks and deficiencies in the prior art, a first object of the present invention is to provide a semiaromatic copolyamide resin based or mainly based on "non-terephthalic acid" monomers with high heat resistance, improved color property, excellent mobility and low water absorption.

Another object of the present invention is to provide a polyamide molding composition containing the above-mentioned semiaromatic copolyamide resin.

The present invention is realized by following technical solution:

A semiaromatic copolyamide resin, consisting of following repeat units by molar percentage:

(A) based on an amount of all monomeric units, 26-80 mol % of units derived from para-amino benzoic acid;

(B) based on the amount of all monomeric units, 4-70 mol % of units derived from 11-aminoundecanoic acid or undecanolactam, and 0-70 mol % of units derived from another amino acid having 6-36 carbon atoms or units consisting of a lactam having 6-36 carbon atoms;

(C) based on the amount of all monomeric units, 0-37 mol % of units derived from a diamine unit having 4-36 carbon atoms; and (D) based on the amount of all monomeric units, 0-37 mol % of units derived from a diacid unit having 6-36 carbon atoms;

wherein, (A)+(B)+(C)+(D)=100 mol %; and molar contents of the units derived from para-amino benzoic acid and the units derived from 11-aminoundecanoic acid or undecanolactam are not equal to 50 mol % simultaneously.

As a further preferred implementation of the present invention, the semiaromatic copolyamide resin consists of the following repeat units by molar percentage:

(A) based on the amount of all monomeric units, 26-80 mol % of the units derived from para-amino benzoic acid; and (B) based on the amount of all monomeric units, 4-70 mol % of the units derived from 11-aminoundecanoic acid or undecanolactam, and 4-70 mol % of the units derived from the amino acids having 6-36 carbon atoms or the units consisting of the lactam having 6-36 carbon atoms;

wherein, (A)+(B)=100 mol %; and the molar contents of the units derived from para-amino benzoic acid and those derived from 11-aminoundecanoic acid or undecanolactam are not equal to 50 mol % simultaneously.

As a further preferred implementation of the present invention, the semiaromatic copolyamide resin consists of the following repeat units by molar percentage:

(A) based on the amount of all monomeric units, 40-60 mol % of the units derived from para-amino benzoic acid;

(B) based on the amount of all monomeric units, 10-40 mol % of the units derived from 11-aminoundecanoic acid or undecanolactam, and 10-40 mol % of the units derived from the amino acids having 6-36 carbon atoms or the units consisting of the lactam having 6-36 carbon atoms;

(C) based on the amount of all monomeric units, 5-25 mol % of the units derived from the diamine unit having 4-36 carbon atoms; and (D) based on the amount of all monomeric units, 5-25 mol % of the units derived from the diacid unit having 6 to 36 carbon atoms;

wherein, (A)+(B)+(C)+(D)=100 mol %; and the molar contents of the units derived from para-amino benzoic acid and those derived from 11-aminoundecanoic acid or undecanolactam are not equal to 50 mol % simultaneously.

As a further preferred implementation of the present invention, in the above-described semiaromatic copolyamide resin, the molar content of the units derived from para-amino benzoic acid is not equal to the molar content of the units derived from 11-aminoundecanoic acid or undecanolactam.

The semiaromatic copolyamide resin according to the present invention, with reference to ASTM D3418-2003, has a melting point of 270-360° C.; with reference to GB12006.1-89, an intrinsic viscosity is 0.80-1.0 dl/g; a water absorption is equal to or less than 2.0%; a b-value is equal to or less than 1.0; wherein a test method for the water absorption is as follows: injection molding a sample into a 20 mm×20 mm×2 mm part, with a weight recorded as a0, after placing the part into water at a temperature of 95° C. for 240 hours, weighing the part with a weight recorded as a1, and the water absorption=(a1−a0)/a0*100%; and a test method for the b-value is as follows: obtaining a smooth panel after injection molding 3000 g of sample particles with a 50*30*2 mm panel mold, and placing the panel on a Color-Eye-7000A computer color photometer of Libero to obtain the b-value.

Particularly, other diamine having 4-36 carbon atoms is selected from one or more of a linear or branched aliphatic diamine, a cycloaliphatic diamine and an aromatic diamine; the linear or branched aliphatic diamine is selected from one or more of 1,4-butylenediamine, 1,5-pentanediamine, 2-methylpentamethylenediamine (MPMD), 1,8-octamethylenediamine (OMDA), 1,9-nonamethylenediamine (NMDA), 2-methyl-1,8-octanediamine (MODA), 2,2,4-trimethyl-6-hexamethylenediamine (TMHMD), 2,4,4-trimethyl-6-hexamethylenediamine (TMHMD), 5-methyl-1,9-nonanediamine, 1,11-undecanediamine, 2-butyl-2-ethyl-1,5-pentanediamine, 1,12-do decanediamine, 1,13-tridecanediamine, 1,14-tetradecanediamine, 1,16-hexadecanediamine and 1,18-octadecanediamine; the cycloaliphatic diamine is selected from one or more of cyclohexanediamine, 1,3-bis(amino-methyl)-cyclohexane (BAC), isophoronediamine, norbornane dimethylamine, 4,4'-diaminodicyclohexyl methane (PACM), 2,2-(4,4'-diaminodicyclohexyl) propane (PACP) and 3,3'-dimethyl-4,4'-diaminodicyclohexyl methane (MACM); and the aromatic diamine is selected from m-xylylenediamine (MXDA).

Particularly, other diacid having 6-36 carbon atoms is selected from one or more of naphthalenedicarboxylic acid (NDA), isophthalic acid (IPS), adipic acid, suberic acid, azelaic acid, sebacic acid, undecanedioic acid, dodecanedioic acid, tridecandioic acid, tetradecanedioic acid, pentadecanedioic acid, hexadecanedioic acid, octadecanedioic acid, dimer acid, cis- and/or trans-cyclohexane-1,4-dicarboxylic acid and cis- and/or trans-cyclohexane-1,3-dicarboxylic acid (CHDA).

The present invention also discloses a polyamide molding composition containing the above-described semiaromatic copolyamide resin, comprising following components in parts by weight:

| | |
|---|---|
| the semiaromatic copolyamide resin | 30-100 parts; |
| a reinforcing filler | 0-70 parts; and |
| an additive | 0-50 parts; | based on a total weight of the polyamide molding composition, an amount of the reinforcing filler is preferably 10-50 parts, more preferably 15-40 parts.

A too low amount of the reinforcing filler leads to relatively poor mechanical properties of the polyamide molding composition; and a too high amount of the reinforcing filler leads to severe glass emergence on a surface of a polyamide molding composition product, which influences an appearance of the product.

The reinforcing filler has a shape of a fibrous shape, with an average length of 0.01 mm to 20 mm, preferably 0.1 mm to 6 mm; the reinforcing filler has an aspect ratio of 5:1 to 2000:1, preferably 30:1 to 600:1. When the amount of the fibrous-shaped reinforcing filler is within the above-mentioned range, the polyamide molding composition shows a high heat deflection temperature and an increased high-temperature rigidity.

The reinforcing filler is an inorganic reinforcing filler or an organic reinforcing filler.

The inorganic reinforcing filler is selected from one or more of a glass fiber, a potassium titanate fiber, a metal-cladded glass fiber, a ceramic fiber, a wollastonite fiber, a metallic carbide fiber, a metal-solidified fiber, an asbestos fiber, an alumina fiber, a silicon carbide fiber, a gypsum fiber or a boron fiber, preferably the glass fiber.

Using the glass fiber can not only enhance a moldability of the polyamide molding composition, but also improve the mechanical properties such as tensile strength, bending strength and bending modulus, and enhance heat resistance such as the heat deflection temperature when a thermoplastic resin composition is being molded.

The organic reinforcing filler is selected from an aromatic polyamide fiber and/or a carbon fiber.

The reinforcing filler has a shape of a non-fibrous shape, such as powder, particle, board, pin, fabric or felt shape, with an average particle size of 0.001 μm to 100 μm, preferably 0.01 μm to 50 μm.

When the average particle size of the reinforcing filler is less than 0.001 μm, poor melt processability of the polyamide resin is resulted in; when the average particle size of the reinforcing filler is more than 100 μm, poor surface appearance of an injection molded product is resulted in.

The average particle size of the above-described reinforcing filler is tested by an adsorption method, which may be selected from one or more of a potassium titanate whisker, a zinc oxide whisker, an aluminum borate whisker, wollastonite, zeolite, sericite, kaolin, mica, talcum, clay, pyrophyllite, bentonite, montmorillonite, lithium montmorillonite, synthetic mica, asbestos, an aluminosilicate, aluminum oxide, silicon oxide, magnesium oxide, zirconium oxide, titanium oxide, ferric oxide, calcium carbonate, magnesium carbonate, dolomite, calcium sulfate, barium sulfate, magnesium hydroxide, calcium hydroxide, aluminum hydroxide, glass beads, ceramic beads, boron nitride, silicon carbide or silicon dioxide.

Theses reinforcing fillers may be hollow; besides, for swelling layered silicates such as bentonite, montmorillonite, lithium montmorillonite, synthetic mica and the like, an organized montmorillonite of which interlayer ions are cation-exchanged by an organic ammonium salt may be used.

In order to achieve better mechanical properties for the polyamide molding composition, a coupling agent may be used for a functional treatment of the inorganic reinforcing filler.

Particularly, the coupling agent is selected from a group consisting of an isocyanate series compound, an organic silane series compound, an organic titanate series compound, an organic borane series compound and an epoxy compound; preferably the organic silane series compound.

Particularly, the organic silane series compound is selected from one or more of an alkoxy silane compound containing an epoxy group, an alkoxy silane compound containing a sulfhydryl group, an alkoxy silane compound containing a ureido group, an alkoxy silane compound containing an isocyanate group, an alkoxy silane compound containing a terminal amino group, an alkoxy silane compound containing a hydroxyl group, an alkoxy silane compound containing a unsaturated carbon-carbon group and an alkoxy silane compound containing an anhydride group.

The alkoxy silane compound containing the epoxy group is selected from one or more of γ-glycidylpropyltrimethoxy silane, γ-glycidylpropyltriethoxy silane and β-(3,4-epoxycyclohexyl)ethyltrimethoxy silane.

The alkoxy silane compound containing the sulfhydryl group is selected from γ-mercaptopropyltrimethoxy silane and/or γ-mercaptopropyltriethoxy silane.

The alkoxy silane compound containing the ureido group is selected from one or more of γ-ureidopropyltriethoxy silane, γ-ureidopropyltrimethoxy silane and γ-(2-ureidoethyl)aminopropyltrimethoxy silane.

The alkoxy silane compound containing the isocyanate group is selected from one or more of γ-isocyanatopropyltriethoxy silane, γ-isocyanatopropyltrimethoxy silane, γ-isocyanatopropylmethyldimethoxy silane, γ-isocyanatopropylmethyldiethoxy silane, γ-isocyanatopropylethyldimethoxy silane, γ-isocyanatopropylethyldiethoxy silane and γ-isocyanatotrichloropropyl silane.

The alkoxy silane compound containing the terminal amino group is select from one or more of γ-(2-aminoethylamino)propyldimethoxymethyl silane, γ-(2-aminoethylamino)propyltrimethoxy silane and γ-aminopropyltrimethoxy silane.

The alkoxy silane compound containing the hydroxyl group is selected from γ-hydroxypropyltrimethoxy silane and/or γ-hydroxypropyltriethoxy silane.

The alkoxy silane compound containing the unsaturated carbon-carbon group is selected from one or more of γ-methacryloxypropyltrimethoxy silane, vinyltrimethoxysilane and N-β-(N-vinylbenzylaminoethyl-γ-aminopropyltrimethoxysilane hydrochloride.

The alkoxy silane compound containing the anhydride group is selected from [3-(trimethoxysilyl)propyl]succinic anhydride.

The organic silane series compound is preferably γ-methacryloxypropyltrimethoxy silane, γ-(2-aminoethylamino)propyldimethoxymethyl silane, γ-(2-aminoethylamino)propyltrimethoxy silane, γ-aminopropyltrimethoxy silane or [3-(trimethoxysilyl)propyl]succinic anhydride.

The inorganic reinforcing filler may be surface treated with the above-described organic silane series compounds according to conventional methods, and then melt-mixed with the polyamide resin to prepare the polyamide molding composition.

When the inorganic reinforcing filler is melt-mixed with the polyamide resin, the organic silane series compound may also be added thereto for in-situ mixing.

Particularly, an amount of the coupling agent is 0.05 wt % to 10 wt % with respect to a weight of the inorganic reinforcing filler, preferably 0.1 wt % to 5 wt %.

When the amount of the coupling agent is less than 0.05 wt %, an obvious effect of improved mechanical properties cannot be reached; when the amount of the coupling agent is more than 10 wt %, the inorganic reinforcing filler aggregates easily and disperses poorly in the polyamide resin, resulting in decreased mechanical properties.

The additive is selected from one or more of a flame retardant, an impact modifier, an additional polymer and a processing agent.

The additional polymer is selected from one or more of an aliphatic polyamide, a polyolefin homopolymer, an ethylene-α-olefin copolymer and an ethylene-acrylate copolymer.

The processing agent is selected from one or more of an antioxidant, a heat-resistant stabilizer, a weatherability agent, a release agent, a lubricant, a pigment, a dye, a plasticizer and an antistatic agent.

The flame retardant is a composition of flame retardants, or a composition of a flame retardant and a flame retardant adjuvant. Based on the total weight of the polyamide molding composition, an amount of the flame retardant is preferably 0-40 parts. A too low amount of the flame retardant leads to a poor flame retardant effect, and a too high amount of the flame retardant leads to decreased mechanical properties of material.

The flame retardant is a halogen flame retardant or a halogen-free flame retardant.

The halogen flame retardant is selected from one or more of brominated polystyrene, a brominated polyphenyl ether, a brominated bisphenol A type epoxy resin, a brominated styrene-maleic anhydride copolymer, a brominated epoxy resin, a brominated phenoxy resin, decabromodiphenyl oxide, decabromobiphenyl, a brominated polycarbonate, perbromotricyclopentadecane or a brominated aromatic cross-linked polymer, preferably brominated polystyrene.

The halogen-free flame retardant is selected from one or more of a nitrogen-containing flame retardant, a phosphorus-containing flame retardant or a nitrogen- and phosphorus-containing flame retardant; preferably the phosphorus-containing flame retardant.

The phosphorus-containing flame retardant is selected from one or more of an aryl monophosphate, an aryl diphosphate, a dimethyl alkylphosphonate, triphenyl phosphate, tritolyl phosphate, trixylenyl phosphate, a propylbenzene series phosphate, a butylbenzene series phosphate and a phosphinate; preferably the phosphinate.

The phosphinate compound is represented by compounds shown as formulas I and/or II as follows:

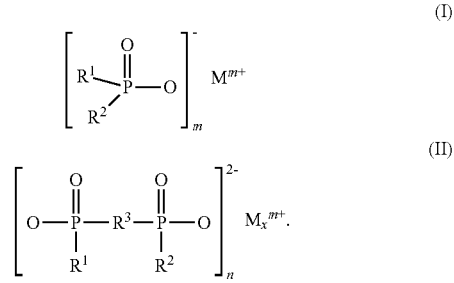

In the formula I and formula II, R1 and R2 may be the same, or different, representing a linear or branched C1- to C6-alkyl, aryl or phenyl, respectively. R3 represents a linear or branched C1- to C10-alkylene, C6- to C10-arylene, C6- to C10-alkylarylene, C6- to C10-arylalkylene. M represents calcium atom, magnesium atom, aluminum atom and/or zinc atom. The m is 2 or 3, n is 1 or 3, and x is 1 or 2.

More specific examples of the phosphinate compound include calcium dimethyl phosphinate, magnesium dimethyl phosphinate, aluminum dimethyl phosphinate, zinc dimethyl phosphinate, calcium ethylmethyl phosphinate, magnesium ethylmethyl phosphinate, aluminum ethylmethyl phosphinate, zinc ethylmethyl phosphinate, calcium diethyl phosphinate, magnesium diethyl phosphinate, aluminum diethyl phosphinate, zinc diethyl phosphinate, calcium methyl n-propyl phosphinate, magnesium methyl n-propyl phosphinate, aluminum methyl n-propyl phosphinate, zinc methyl n-propyl phosphinate, calcium methanedimethyl phosphinate, magnesium methanedimethyl phosphinate, aluminum methanedimethyl phosphinate, zinc methanedimethyl phosphinate, calcium benzene-1,4-dimethyl phosphinate, magnesium benzene-1,4-dimethyl phosphinate, aluminum benzene-1,4-dimethyl phosphinate, zinc benzene-1,4-dimethyl phosphinate, calcium methylphenyl phosphinate, magnesium methylphenyl phosphinate, aluminum methylphenyl phosphinate, zinc methylphenyl phosphinate, calcium diphenyl phosphinate, magnesium diphenyl phosphinate, aluminum diphenyl phosphinate, zinc diphenyl phosphinate and the like, preferably calcium dimethyl phosphinate, aluminum dimethyl phosphinate, zinc dimethyl phosphinate, calcium ethylmethyl phosphinate, aluminum ethylmethyl phosphinate, zinc ethylmethyl phosphinate, calcium diethyl phosphinate, aluminum diethyl phosphinate, zinc diethyl phosphinate, and more preferably aluminum diethyl phosphinate.

The phosphinate compound used as the flame retardant is commercially available easily. Examples of the phosphinate compound which is commercially available include EXOLIT OP1230, OP1311, OP1312, OP930, OP935 and the like produced by Clariant.

The polyamide molding composition containing the above-described semiaromatic copolyamide resin of the present invention, based on the total weight of the polyamide molding composition, the additive component may further contain at most 45 wt % of one or more of the impact modifiers, preferably 5 wt % to 30 wt %.

Particularly, the impact modifier may be a natural rubber, polybutadiene, polyisoprene, polyisobutene, copolymers of butadiene and/or isoprene with styrene and/or derivatives of styrene and with other comonomers, a hydrogenated copolymer, and/or a copolymer prepared by being grafted or copolymerized with an anhydride, (meth)acrylic acid or an ester thereof. The impact modifier may further be a grafted rubber having a cross-linked elastomer core, the cross-linked elastomer core consists of butadiene, isoprene or an alkyl acrylate, and the impact modifier has a grafted shell consisting of polystyrene or may be a nonpolar or polar olefin homopolymer or copolymer, such as ethylene propylene rubber, ethylene-propylene-diene rubber, or ethylene-octene rubber, or ethylene-vinyl acetate rubber, or a nonpolar or polar olefin homopolymer or the copolymer prepared by being grafted or copolymerized with the anhydride, (meth)acrylic acid or the ester thereof. The impact modifier may further be a carboxylic acid-functionalized copolymer, such as poly(ethylene-co-(meth)acrylic acid) or poly(ethylene-1-olefin-co-(meth)acrylic acid), wherein 1-olefin is a chain olefin or an unsaturated (meth)acrylate having more than four atoms, including those copolymers that an acid group is neutralized by a metal ion to a certain extent.

The impact modifier based on a styrene monomer (styrene and derivatives of styrene) and other vinyl aromatic monomer, is a block copolymer consisting of an alkenyl aromatic compound and a conjugated diene, and a hydrogenated block copolymer consisting of the alkenyl aromatic compound and the conjugated diene, and combinations of these types of impact modifiers. The block copolymer contains at least one block a derived from the alkenyl aromatic compound and at least one block b derived from the conjugated diene. In the case of the hydrogenated block copolymer, a proportion of an aliphatic unsaturated carbon-carbon double bond may be decreased by a hydrogenation. Suitable block copolymers are di-, tri-, tetra- and multi-block copolymers having a linear chain structure. However, according to the present invention, a branched structure and an asteroid structure may also be used. A branched block copolymer obtained in known ways, may be obtained by for example a grafting reaction of a "side branched chain" of a polymer grafting to a backbone of the polymer.

Other alkenyl aromatic compound which may be used with styrene or used in a way with a mixture of styrene, is a vinyl aromatic monomer that an aromatic ring and/or the C=C double bond is substituted by C1-C20 alkyl or halogen atoms.

Examples of the alkenyl aromatic compound are styrene, p-methylstyrene, α-methylstyrene, ethylstyrene, tert-butylstyrene, vinyltoluene, 1,2-diphenylethylene, 1,1-diphenylethylene, vinylxylene, vinylnaphthalene, divinyl benzene, bromostyrene, and chlorostyrene, and combinations thereof. Styrene, p-methylstyrene, α-methylstyrene, and vinylnaphthalene are preferred.

Styrene, α-methylstyrene, p-methylstyrene, ethylstyrene, tert-butylstyrene, vinyltoluene, 1,2-diphenylethylene, 1,1-diphenylethylene, or mixtures thereof are preferred. Usage of styrene is particularly preferred. However, an alkenylnaphthalene may also be used.

Examples of diene monomer that may be used are 1,3-butadiene, 2-methyl-1,3-butadiene, 2,3-dimethyl-1,3-butadiene, 1,3-pentadiene, 1,3-hexadiene, isoprene, chloroprene and trans-1,3-pentadiene. 1,3-butadiene and isoprene are preferred, especially 1,3-butadiene (shown as butadiene in an abbreviated form hereinafter).

An alkenyl aromatic monomer used preferably includes styrene, the diene monomer used preferably includes butadiene, and it means that a styrene-butadiene block copolymer is preferred. The block copolymer is generally prepared by polymerization of anions in its known way.

In addition to the styrene monomer and the diene monomer, other monomers may also be used simultaneously. Based on a total amount of monomers used, a proportion of the comonomer is preferably 0-50 wt %, particularly preferably 0-30 wt %, and particularly preferably 0-15 wt %. Examples of suitable comonomer are respectively the acrylate, especially C1-C12 alkyl acrylate such as n-butyl acrylate or 2-ethylhexyl acrylate, and a methacrylate, especially C1-C12 alkyl methacrylate such as methyl methacrylate (MMA). Other possible comonomers are (meth)acrylonitrile, (meth)glycidyl acrylate, methoxyethene, diallyl of glycol and divinyl ether, divinyl benzene and vinyl acetate.

In addition to the conjugated diene, the hydrogenated block copolymer may further include a lower hydrocarbon part if suitable, such as ethylene, propylene, 1-butylene, dicyclopentadiene or a non-conjugated diene. A proportion of an unreduced aliphatic unsaturated bond which is derived from the block b is less than 50% in the hydrogenated block copolymer, preferably less than 25%, especially less than 10%. An aromatic part which is derived from the block a is reduced to an extent of at most 25%. By hydrogenation of the styrene-butadiene copolymer and hydrogenation of a styrene-butadiene-styrene copolymer, the hydrogenated block copolymer is obtained, i.e. a styrene-(ethylene-butylene) diblock copolymer and a styrene-(ethylene-butylene)-styrene triblock copolymer.

The block copolymer preferably includes 20-90 wt % of the block a, especially 50-85 wt % of the block a. The diene may be introduced to the block b in 1,2-orientation or 1,4-orientation.

A molar mass of the block copolymer is 5000-500000 g/mol, preferably 20000-300000 g/mol, especially 40000-200000 g/mol.

Suitable hydrogenated block copolymer is a commercially available product, such as G1650, G1651 and G1652 (Kraton polymer), and H1041, H1043, H1052, H1062, H1141 and H1272 (Asahi Chemicals).

Examples of a non-hydrogenated block copolymer are polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene, and poly(α-methylstyrene)-polybutadiene-poly(α-methylstyrene), and combinations thereof.

Suitable non-hydrogenated block copolymers that are commercially available are multiple products with trademarks of Phillips, Shell, Dexco and Kuraray.

According to the polyamide molding composition comprising the above-described semiaromatic copolyamide resin of the present invention, the additive component may further comprise the additional polymer selected from the aliphatic polyamide, the polyolefin homopolymer, the ethylene-α-olefin copolymer and the ethylene-acrylate copolymer.

The aliphatic polyamide includes but not limited to one or more of an aliphatic diacid having 4-20 carbon atoms and an aliphatic diamine having 4-20 carbon atoms, or a lactam having 4-20 carbon atoms, or a polymer of the aliphatic diacid, the aliphatic diamine and the lactam having 4-20 carbon atoms. The aliphatic polyamide includes but not limited to poly(hexamethylene adipamide) (PA66), poly-caprolactam (PA6), poly(hexamethylene sebacamide) (PA610), poly(decamethylene sebacamide) (PA1010), poly(hexamethylene adipamide-co-caprolactam) (PA66/6), poly-undecanolactam (PA11), polylauryllactam (PA12), and a mixture of two or more thereof.

The ethylene-α-olefin copolymer is preferably an EP elastomer and/or an EPDM elastomer (ethylene-propylene rubber and ethylene-propylene-diene rubber, respectively). For example, the elastomer may comprise an elastomer based on ethylene-C3-C12-α-olefin copolymer containing 20-96 wt %, preferably 25-85 wt %, of ethylene, wherein a C3-C12-α-olefin is particularly preferred, including olefins selected from propylene, 1-butylene, 1-pentene, 1-hexene, 1-octene, 1-decene and/or 1-laurylene, and the additional polymer particularly preferred includes one or more of ethylene-propylene rubber, LLDPE and VLDPE.

Alternatively or additionally (for example in the mixture), the additional polymer may further comprise a terpolymer based on ethylene-C3-C12-α-olefin and the non-conjugated diene, here preferably it comprises 25-85 wt % of ethylene and at most 10 wt % of the non-conjugated diene, and here the particularly preferred C3-C12-α-olefin includes an olefin selected from propylene, 1-butylene, 1-pentene, 1-hexene, 1-octene, 1-decene and/or 1-laurylene, and/or wherein the non-conjugated diene is preferably selected from bicyclo[2.2.1]heptadiene, 1,4-hexadiene, dicyclopentadiene and/or particularly 5-ethylidene-2-norbornene.

The ethylene-acrylate copolymer may also be used as components of the additional polymer.

Other possible forms of the additional polymer are an ethylene-butylene copolymer and a mixture (blend) containing these systems, respectively.

Preferably, the additional polymer comprises a component having an anhydride group, which is performed a thermal reaction or a free radical reaction of a backbone polymer with an unsaturated dicarboxylic anhydride, with an unsaturated dicarboxylic acid, or with a monoalkyl ester of the unsaturated dicarboxylic acid, being introduced in a concentration sufficient for well combining with the polyamide, and here the following agents are preferably used, selected from:

maleic acid, maleic anhydride, monobutyl maleate, fumaric acid, aconitic acid and/or itaconic anhydride. Preferably, 0.1-4.0 wt % of the unsaturated anhydride is grafted onto an impact resistance component which is used as C component, or the unsaturated dicarboxylic anhydride or its precursor may be added by grafting with other unsaturated monomers. Generally, a grafting degree is preferably 0.1%-1.0%, particularly preferably 0.3%-0.7%. The other possible component of the additional polymer is a mixture consisting of the ethylene-propylene copolymer and the ethylene-butylene copolymer, and here a grafting degree of the maleic anhydride (grafting degree of MA) is 0.3%-0.7%.

The above-described possible system used for the additional polymer may also be used in a form of a mixture.

Besides, the additive component may comprise a component having a functional group, the functional group for example being a carboxyl group, an ester group, an epoxy group, an oxazolinyl group, a carbodiimide group, an isocyanate group, a silanol group and a carboxylic ester group, or the additive component may comprise a combination of two or more of the above-described functional groups. Monomers having the functional group may be combined by being copolymerized or being grafted onto an elastomer polyolefin.

Besides, the impact modifier based on the olefin polymer may also be modified by being grafted with an unsaturated silane compound, and the unsaturated silane compound is for example vinyltrimethoxysilane, vinyltriethoxysilane, vinyltriacetylsilane, methacryloxypropyltrimethoxysilane, or allyltrimethoxysilane.

The elastomer polyolefin is a random copolymer, an alternate copolymer or a block copolymer which has a linear chain structure, a branched chain structure or a core-shell structure, and the elastomer polyolefin comprises a functional group which can react with a terminal group of the polyamide, and thus a sufficient compatibility is provided between the polyamide and the impact modifier.

Therefore, the impact modifier of the present invention includes a homopolymer of the olefin (such as ethylene, propylene, 1-butylene) or a copolymer of the olefin (such as polybutene-1), or a copolymer of the olefin and a copolymerizable monomer (such as vinyl acetate, (meth)acrylate, and methylhexadiene).

Examples of a crystallizable olefin polymer is a low-density polyethylene, a medium-density polyethylene and a high-density polyethylene, polypropylene, polybutadiene, poly-4-methylpentene, an ethylene-propylene block copolymer, or an ethylene-propylene random copolymer, an ethylene-methylhexadiene copolymer, a propylene-methylhexadiene copolymer, an ethylene-propylene-butylene copolymer, an ethylene-propylene-hexene copolymer, an ethylene-propylene-methylhexadiene copolymer, poly(ethylene-vinyl acetate) (EVA), poly(ethylene-ethyl acrylate) (EEA), an ethylene-octene copolymer, an ethylene-butylene copolymer, an ethylene-hexene copolymer, an ethylene-propylene-diene terpolymer, and combinations of above-described polymers.

Examples of the commercially available impact modifiers that may be used for the additive component are as follows:

TAFMER MC201: a blend of g-MA(–0.6%)67% EP copolymer (20 mol % of propylene)+33% EB copolymer (15 mol % of 1-butylene)): Mitsui Chemicals, Japan.

TAFMER MH5010: g-MA(–0.6%)ethylene-butylene copolymer; Mitsui.

TAFMER MH7010: g-MA(–0.7%) ethylene-butylene copolymer; Mitsui.

TAFMER MH7020: g-MA(–0.7%)EP copolymer; Mitsui.

EXXELOR VA1801: g-MA(–0.7%)EP copolymer; Exxon Mobile Chemicals, US.

EXXELOR VA1803: g-MA(0.5-0.9%)EP copolymer, amorphous, Exxon.

EXXELOR VA1810: g-MA(–0.5%)EP copolymer, Exxon.

EXXELOR MDEX 9411: g-MA(0.7%)EPDM, Exxon.

FUSABOND MN493D: g-MA(–0.5%)ethylene-octene copolymer, DuPont, US.

FUSABOND A EB560D: (g-MA)ethylene-n-butyl acrylate copolymer, DuPont ELVALOY, DuPont.

Further, an ionic polymer is preferred, wherein carboxyl groups for polymer bonding are all bonded with each other or bonded to a certain extent by the metal ions.

The copolymer of butadiene and styrene which is graft-functionalized by maleic anhydride, the nonpolar or polar olefin homopolymer or copolymer prepared by being grafted with maleic anhydride, and a carboxylic-functionalized copolymer such as poly(ethylene-co-(meth)acrylic acid) or poly(ethylene-1-olefin-co-(meth)acrylic acid), are particularly preferred, wherein the acid group has been neutralized by the metal ions to some extent.

Besides, within the scope of not destroying effects of the present invention, various processing agents may be added to the polyamide resin of the present invention at any moment, such as an antioxidant and/or a heat-resistant stabilizer (a hindered phenol series, a hydroquinone series, a phosphite series and a substituent thereof, a copper halide, an iodine compound and the like), a weatherability agent (a resorcinol series, a salicylate series, a benzotriazole series, a diphenylketone series, a hindered amine series and the like), a release agent and a lubricant (an aliphatic alcohol, an aliphatic amide, an aliphatic bisamide, a diurea and a polyethylene wax and the like), a pigment (cadmium sulfide, phthalocyanine, carbon black and the like), a dye (nigrosine, aniline black and the like), a plasticizer (n-octyl 4-hydroxy-benzoate, N-butyl benzenesulfon amide and the like), and an antistatic agent (an anionic antistatic agent of alkyl sulfate type, a cationic antistatic agent of quaternary ammonium salt type, a nonionic antistatic agent such as polyoxyethylene sorbitan monostearate, an amphoteric antistatic agent of betaine series).

In order to obtain a molding product of the present invention, the polyamide resin or the polyamide resin composition of the present invention may be molded by any molding method such as injection molding, extrusion molding, blow molding, vacuum molding, melt spinning and film molding. These molding products may be molded into a shape as required, and may be used in a resin molding product such as an automobile part and a mechanical part. As a specific use, they are available in the following uses: parts that contact with coolant inside an automobile engine room when used, such as an engine coolant part of automobile, especially a radiator tank part such as a top and a bottom of the radiator tank, a coolant storage tank, a water pipe, water pump parts such as a water pump housing, a water pump impeller and a valve; and electrical/electronic-related parts, automobile/vehicle-related parts, household appliances/office appliances parts, computer-related parts, fax machine/duplicator-related parts, mechanical-related parts and other various uses, represented by; switch types, a subminiature slide switch, a DIP switch, a switch housing, a lampholder, a strapping tape, an connector, a connector housing, a connector cover, IC socket types, a winding shaft, a spool cover, a relay, a relay cabinet, a capacitor case, an internal parts of a motor, a mini motor case, a gear cam, a balancing wheel, a gasket, an isolator, a fastener, a buckle, a clip, a bicycle wheel, a caster, a safety helmet, a terminal block, a shell of an electric tool, an insulation part of a starter, a spoiler, a tank, a radiator tank, a chamber tank, a fluid container, a fuse block, an air purifier housing, an air conditioning fan, a terminal shell, a wheel casing, a suction/exhaust pipe, a bearing retainer, an air cylinder cover, an inlet manifold, a water pipe impeller, a clutch tripping lever, a loudspeaker oscillating plate, a heat-resistant container, a part of a microwave oven, a part of an electric cooker and a printer color tape guider.

The polyamide molding composition of the present invention has a water absorption equal to or less than 1.0%, and according to the national standard GB/T 1634.2-2004, a heat deflection temperature is tested as 280° C. to 320° C.; a b-value is equal to or less than 3.0; wherein the test method for the water absorption is as follows: injection molding a sample into a 20 mm×20 mm×2 mm part, with a weight recorded as a0, after placing the part into water at a temperature of 95° C. for 240 hours, weighing the part with a weight recorded as a1, and the water absorption=(a1−a0)/a0*100%; the test method for the b-value is as follows: obtaining a smooth panel after injection molding 3000 g of sample particles with a 50*30*2 mm panel mold, and placing the panel on the Color-Eye-7000A computer color photometer of Libero to obtain the b-value.

Compared to the prior art, the present invention possesses the following beneficial effects:

in the present invention, by replacing terephthalic acid with a para-amino benzoic acid monomer and controlling the molar contents of the para-amino benzoic acid unit and the 11-aminoundecanoic acid unit or the undecanolactam unit, the prepared semiaromatic copolyamide resin has property advantages such as high heat resistance, improved color property, excellent flowability and low water absorption, and the polyamide molding composition consisting of the same also has obvious advantage in the properties such as heat resistance, water absorption and color.

DESCRIPTION OF THE EMBODIMENTS

The present invention will be further described by specific implementations below, and embodiments below are the preferred implementations of the present invention, but the implementations of the present invention are not limited by the following embodiments.

Raw materials used in the present invention are all commercially available.

Performance Test Methods:

A test method of melting point of the semiaromatic copolyamide resin: in accordance with ASTM D3418-2003; the specific test method is as follows: Perkin Elmer Dimond DSC Analyzer was used for testing the melting point of a sample; a nitrogen atmosphere with a flow rate of 40 mL/min; the sample was heated to 340° C. at a rate of 10° C./min, held at 340° C. for 2 minutes, then cooled to 50° C. at a rate of 10° C./min, and heated to 340° C. at a rate of 10° C./min again, and an endothermic peak temperature at this moment was set as the melting point $T_m$.

A test method of intrinsic viscosity of the semiaromatic copolyamide resin: polyamide intrinsic viscosity test method in accordance with GB12006.1-89; the specific test method is as follows: the intrinsic viscosity of the polyamide was measured in 98% concentrated sulfuric acid at 25° C.±0.01° C.

A test method of water absorption: injection molding a sample into a 20 mm×20 mm×2 mm part, with a weight recorded as a0; after placing the part into water at a temperature of 95° C. for 240 hours, weighing the part with a weight recorded as a1. And the water absorption=(a1−a0)/a0*100%.

A test method of a product color (b-value) of the semiaromatic copolyamide resin (molding composition): obtaining a smooth panel after injection molding 3000 g of sample particles with a 50*30*2 mm panel mold, and placing the panel on the Color-Eye-7000A computer color photometer of Libero to obtain a b-value. The value reflects the color of the semiaromatic copolyamide resin (molding composition) product, and the higher the value, the worse the product color.

A test of a heat deflection temperature: testing according to the national standard GB/T 1634.2-2004.

Synthesis of Semiaromatic Copolyamide Resin A-J and A'-F'

Reaction raw materials were added into a pressure reactor equipped with a magnetic coupling stir, a condenser tube, a gas-phase mouth, a feeding mouth and a pressure anti-explosion mouth. Then benzoic acid, sodium hypophosphite and deionized water were added. The amount of benzoic acid accounted for 2.5% of a molar content of all monomers, the weight of sodium hypophosphite accounted for 0.1% of the weight of other materials except for deionized water, and the weight of the deionized water accounted for 30% of the weight of all materials. The pressure reactor was vacuumized and high purity nitrogen was charged as protection air, and a reaction mixture was heated to 220° C. within 2 hours under stirring and was stirred for another hour at 220° C., followed by being heated to 230° C. under stirring. The reaction was carried on for 2 hours at a constant temperature of 230° C. and under a constant pressure of 2.2 MPa, and the pressure was kept constant by removing water formed. Discharging was carried out after the reaction was finished, a prepolymer was vacuum dried for 24 hours at 80° C. to obtain a prepolymerized product. The prepolymerized product was solid-phase tackified in a condition of 30-60° C. below the melting point and 50 Pa vacuum, and the semiaromatic copolyamide resin was obtained. Property indices such as the intrinsic viscosity, melting point, water absorption and color of the obtained semiaromatic copolyamide resin are listed in Table 1.

TABLE 1

| | Resin A | Resin B | Resin C | Resin D | Resin E | Resin F | Resin G | Resin H | Resin I | Resin J |
|---|---|---|---|---|---|---|---|---|---|---|
| Para-amino benzoic acid/mol | 30 | 35 | 40 | 50 | 60 | 50 | 50 | 40 | 40 | 80 |
| 11-aminoundecanoic acid/mol | 70 | 65 | 60 | 40 | 40 | 40 | 20 | 40 | | 4 |
| Undecanolactam/mol | | | | | | | | | 60 | |
| 1,6-hexanediamine/mol | | | | | | 5 | 10 | 10 | | 4 |
| Adipic acid/mol | | | | | | 5 | 10 | 10 | | 4 |
| Caprolactam/mol | | | | 10 | | | 10 | | | 8 |
| Melting point/° C. | 271 | 290 | 301 | 315 | 328 | 311 | 320 | 325 | 303 | 343 |
| Intrinsic viscosity/dl/g | 0.87 | 0.88 | 0.85 | 0.83 | 0.89 | 0.86 | 0.84 | 0.92 | 0.88 | 0.90 |
| Water absorption/% | 1.3 | 1.3 | 1.2 | 1.0 | 1.2 | 1.2 | 1.0 | 1.7 | 1.1 | 1.6 |
| b | −1.5 | −1.7 | −1.6 | −1.8 | −1.5 | −1.7 | −1.8 | 0.9 | −1.5 | 0.5 |

| | Resin A' | Resin B' | Resin C' | Resin D' | Resin E' | Resin F' |
|---|---|---|---|---|---|---|
| Para-amino benzoic acid/mol | 10 | 90 | 40 | 40 | 50 | 50 |
| 1,6-hexanediamine/mol | | | | 30 | | |
| Adipic acid/mol | | | | 30 | | |

TABLE 1-continued

| | | | | | | |
|---|---|---|---|---|---|---|
| Caprolactam/mol | | | 60 | | | |
| 11-aminoundecanoic acid/mol | 90 | 10 | | | 50 | |
| Undecanolactam/mol | | | | | | 50 |
| Melting point/° C. | 210 | The melting point was higher than a decomposition temperature, and it was difficult to perform the experiment. | 322 | 318 | 307 | 308 |
| Intrinsic viscosity/dl/g | 0.88 | | 0.87 | 0.91 | 2.35 | 2.46 |
| Water absorption/% | 1.4 | | 1.7 | 1.8 | 1.6 | 1.7 |
| b | −1.4 | | 2.5 | 2.0 | 1.8 | 1.9 |

It can be seen from Table 1 that in the resins A-J, by replacing terephthalic acid with the para-amino benzoic acid monomer and controlling the molar contents of the para-amino benzoic acid unit and the 11-aminoundecanoic acid unit or the undecanolactam unit, the prepared semiaromatic copolyamide resin had advantages such as high heat resistance, improved color property, excellent flowability and low water absorption. In the resin A', the content of para-amino benzoic acid was too low that the melting point of the resin was relatively low and the heat resistance was very poor; in the resin B', the content of para-amino benzoic acid was too high that the melting point of the resin was higher than the decomposition temperature, leading to none application value; in the resins C' and D', 11-aminoundecanoic acid was not used as a comonomer, resulting in poor color of the resin, while in the resins E' and F', the contents of para-amino benzoic acid and 11-aminoundecanoic acid or undecanolactam were 50 mol % simultaneously, i.e. molar ratios of those two were the same, resulting in that a molecular weight of the resin was hard to control, with quite high intrinsic viscosity and poor flowability, which is bad for the injection molding in later stage.

EMBODIMENTS 1-8 AND COMPARATIVE EXAMPLES 1-6: PREPARATION OF THE POLYAMIDE MOLDING COMPOSITION

The semiaromatic copolyamide resin, a reinforcing filler, a flame retardant and other aids were mixed uniformly in a high-speed mixer according to formulas in Table 2, followed by being added into a double-screw extruder through a main feed port, while the reinforcing filler was side-fed through a side-feed scales. After extruding, cooling by means of water, pelletizing and drying, the polyamide composition was obtained. Particularly, an extrusion temperature was set 20° C. above the melting point and results of each property are shown as Table 2.

TABLE 2

Components of the polyamide molding composition and test results of properties (parts by weight)

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| Type of the semiaromatic copolyamide resin | C | C | F | F | G | H | I | J |
| Weight of the semiaromatic copolyamide resin | 30 | 60 | 30 | 60 | 50 | 30 | 75 | 50 |
| Glass fiber OCV995 | 60 | 20 | 60 | 20 | 30 | 60 | 15 | 30 |
| Phosphinate OP 1230 | | 10 | | 10 | 10 | | | 10 |
| Wollastonite | 5 | 5 | 5 | 5 | 5 | 5 | 5 | 5 |
| Polybutylene-1 | 5 | 5 | 5 | 5 | 5 | 5 | 5 | 5 |
| Water absorption/% | 0.4 | 0.7 | 0.5 | 0.9 | 0.7 | 0.6 | 0.8 | 0.8 |
| Heat deflection temperature (1.8 MPa)/° C. | 287 | 282 | 293 | 281 | 288 | 290 | 280 | 311 |
| b | 0.8 | 2.2 | 0.5 | 2.0 | 1.9 | 3.0 | 0.7 | 3.0 |

| | Comparative Example 1 | Comparative Example 2 | Comparative Example 3 | Comparative Example 4 | Comparative Example 5 |
|---|---|---|---|---|---|
| Type of the semiaromatic copolyamide resin | A' | C' | D' | E' | F' |
| Weight of the semiaromatic copolyamide resin | 60 | 60 | 50 | 60 | 60 |
| Glass fiber OCV995 | 20 | 20 | 30 | 20 | 20 |

TABLE 2-continued

Components of the polyamide molding composition and test results of properties (parts by weight)

| | | | | | |
|---|---|---|---|---|---|
| Phosphinate OP 1230 | 10 | 10 | 10 | 10 | 10 |
| Wollastonite | 5 | 5 | 5 | 5 | 5 |
| Polybutylene-1 | 5 | 5 | 5 | 5 | 5 |
| Water absorption/% | 1.1 | 1.1 | 1.2 | 1.2 | 1.1 |
| Heat deflection temperature (1.8 MPa)/° C. | 177 | 278 | 275 | 271 | 273 |
| b | 3.4 | 6.7 | 6.5 | 5.8 | 6.2 |

It can be seen from Table 2 that in the same formula of the molding composition, the polyamide molding composition comprising the semiaromatic copolyamide resin of the present invention possessed obvious advantage in the properties, such as heat resistance, water absorption and color.

What is claimed is:

1. A semiaromatic copolyamide resin consisting of the following repeat units by molar percentage:
   (A) based on an amount of all monomeric units, 40-60 mol % of units derived from para-amino benzoic acid;
   (B) based on the amount of all monomeric units, 10-40 mol % of units derived from 11-aminoundecanoic acid or undecanolactam, and 10-40 mol % of units derived from amino acids having 6-36 carbon atoms other than 11-aminodecanoic acid or units consisting of a lactam having 6-36 carbon atoms other than undecanolactam;
   (C) based on the amount of all monomeric units, 5-25 mol % of units derived from a diamine unit having 4-36 carbon atoms; and
   (D) based on the amount of all monomeric units, 5-25 mol % of units derived from a diacid unit having 6-36 carbon atoms;
   wherein, (A)+(B)+(C)+(D)=100 mol %.

2. The semiaromatic copolyamide resin according to claim 1, wherein the molar content of the units derived from para-amino benzoic acid is not equal to the molar content of the units derived from 11-aminoundecanoic acid or undecanolactam.

3. The semiaromatic copolyamide resin according to claim 1, wherein with reference to ASTM D3418-2003, a melting point of the semiaromatic copolyamide resin is 270-360° C.; with reference to GB12006.1-89, an intrinsic viscosity is 0.80-1.0 dl/g; a water absorption is equal to or less than 2.0%; a b-value is equal to or less than 1.0; wherein a test method for the water absorption is as follows: injection molding a sample into a 20 mm×20 mm×2 mm part, with a weight recorded as a0, after placing the part into water at a temperature of 95° C. for 240 hours, weighing the part with a weight recorded as a1, and the water absorption=(a1−a0)/a0*100%; and a test method for the b-value is as follows: obtaining a smooth panel after injection molding 3000 g of sample particles with a 50 mm×30 mm×2 mm panel mold, and placing the panel on a computer color photometer to obtain the b-value.

4. The semiaromatic copolyamide resin according to claim 1, wherein the diamine unit having 4 to 36 carbon atoms is selected from one or more of a linear or branched aliphatic diamine, a cycloaliphatic diamine and an aromatic diamine; the linear or branched aliphatic diamine is selected from one or more of 1,4-butylenediamine, 1,5-pentanediamine, 2-methylpentamethylenediamine, 1,8-octamethylenediamine, 1,9-nonamethylenediamine, 2-methyl-1,8-octanediamine, 5-methyl-1,9-nonanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine and 1,18-octadecanediamine; the cycloaliphatic diamine is selected from one or more of cyclohexanediamine, 1,3-bis(amino-methyl)-cyclohexane, isophoronediamine, norbornane dimethylamine, 4,4'-diaminodicyclohexylmethane, 2,2-(4,4'-diaminodicyclohexyl)propane and 3,3'-dimethyl-4,4'-diaminodicyclohexylmethane; and the aromatic diamine is selected from m-xylylenediamine.

5. The semiaromatic copolyamide resin according to claim 1, wherein the diacid unit having 6-36 carbon atoms is selected from one or more of naphthalenedicarboxylic acid, isophthalic acid, adipic acid, suberic acid, azelaic acid, sebacic acid, undecanedioic acid, dodecanedioic acid, tridecandioic acid, tetradecanedioic acid, pentadecanedioic acid, hexadecanedioic acid, octadecanedioic acid, dimer acid, cis- and/or trans-cyclohexane-1,4-dicarboxylic acid and cis- and/or trans-cyclohexane-1,3-dicarboxylic acid.

6. A polyamide molding composition containing the semiaromatic copolyamide resin according to claim 1, comprising the following components in parts by weight:
   the semiaromatic copolyamide resin 30-100 parts;
   a reinforcing filler 0-70 parts; and
   an additive 0-50 parts.

7. The polyamide molding composition according to claim 6, wherein the reinforcing filler has a shape of a fibrous shape, with an average length of 0.01 mm to 20 mm; the reinforcing filler has a draw ratio of 5:1 to 2000:1; based on a total weight of the polyamide molding composition, an amount of the reinforcing filler is 10 to 50 parts; the reinforcing filler is an inorganic reinforcing filler or an organic reinforcing filler, the inorganic reinforcing filler being selected from one or more of a glass fiber, a potassium titanate fiber, a metal-cladded glass fiber, a ceramic fiber, a wollastonite fiber, a metallic carbide fiber, a metal-solidified fiber, an asbestos fiber, an alumina fiber, a silicon carbide fiber, a gypsum fiber and a boron fiber; and the organic reinforcing filler is selected from an aromatic polyamide fiber and/or a carbon fiber.

8. The polyamide molding composition according to claim 6, wherein the reinforcing filler has a shape of a non-fibrous shape, with an average particle size of 0.001 μm to 100 μm, and is selected from one or more of wollastonite, zeolite, sericite, kaolin, mica, talcum, clay, pyrophyllite, bentonite, montmorillonite, lithium montmorillonite, synthetic mica, asbestos, an aluminosilicate, aluminum oxide, silicon oxide, magnesium oxide, zirconium oxide, titanium oxide, ferric oxide, calcium carbonate, magnesium carbonate, dolomite, calcium sulfate, barium sulfate, magnesium hydroxide, calcium hydroxide, aluminum hydroxide, glass beads, ceramic beads, boron nitride, silicon carbide or silicon dioxide.

9. The polyamide molding composition according to claim 6, wherein the additive is selected from one or more of a flame retardant, an impact modifier, an additional polymer and a processing agent; the flame retardant is a halogen flame retardant or a halogen-free flame retardant; and said additional polymer is selected from one or more of an aliphatic polyamide, a polyolefin homopolymer, an ethylene-α-olefin copolymer or an ethylene-acrylate copolymer.

10. The polyamide molding composition according to claim 6, wherein the polyamide molding composition has a water absorption equal to or less than 1.0%; a heat deflection temperature of 280° C. to 320° C. according to the national standard GB/T 1634.2-2004; a b-value is equal to or less than 3.0; wherein a test method for the water absorption is as follows: injection molding a sample into a 20 mm×20 mm×2 mm part, with a weight recorded as a0, after placing the part into water at a temperature of 95° C. for 240 hours, weighing the part with a weight recorded as a1, and the water absorption=(a1−a0)/a0*100%; and a test method for the b-value is as follows: obtaining a smooth panel after injection molding 3000 g of sample particles with a 50 mm×30 mm×2 mm panel mold, and placing the panel on a computer color photometer to obtain the b-value.

* * * * *